United States Patent
Foley et al.

(10) Patent No.: US 10,457,071 B2
(45) Date of Patent: Oct. 29, 2019

(54) OBJECT HOLDER WITH PNEUMATIC CLAMPING FRAME FOR A DIRECT-TO-OBJECT PRINTER

(71) Applicant: Xerox Corporation, Norwalk, CT (US)

(72) Inventors: Timothy P. Foley, Marion, NY (US);
D. Clay Johnson, Rochester, NY (US);
Mark A. Atwood, Rush, NY (US);
Eliud Robles Flores, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 120 days.

(21) Appl. No.: 15/873,940

(22) Filed: Jan. 18, 2018

(65) Prior Publication Data

US 2019/0217630 A1    Jul. 18, 2019

(51) Int. Cl.

| | |
|---|---|
| *B25J 15/06* | (2006.01) |
| *B41J 3/407* | (2006.01) |
| *B41J 2/01* | (2006.01) |
| *B05B 13/04* | (2006.01) |
| *B41J 2/175* | (2006.01) |

(52) U.S. Cl.
CPC ......... *B41J 3/4073* (2013.01); *B05B 13/0431* (2013.01); *B25J 15/0625* (2013.01); *B41J 2/17596* (2013.01)

(58) Field of Classification Search
CPC . B41J 3/4073; B41M 5/0088; B05B 13/0431; B25J 15/0625; B25J 15/0616
See application file for complete search history.

(56) References Cited

U.S. PATENT DOCUMENTS

| | | | | |
|---|---|---|---|---|
| 4,561,686 A | * | 12/1985 | Atchley ................ | B66C 1/0206 294/188 |
| 10,308,038 B2 | * | 6/2019 | Hoover .................. | B41J 3/4073 |
| 2012/0280421 A1 | | 11/2012 | Keating et al. | |
| 2014/0310890 A1 | * | 10/2014 | Miller .................. | A43B 3/0084 12/123 |
| 2016/0052147 A1 | | 2/2016 | Spicer et al. | |

OTHER PUBLICATIONS

U.S. Appl. No. 15/163,880, filed May 25, 2016.
U.S. Appl. No. 15/477,580, filed Apr. 3, 2017.
(Continued)

*Primary Examiner* — Leslie J Evanisko
(74) *Attorney, Agent, or Firm* — Fox Rothschild LLP

(57) ABSTRACT

A system and method for printing on a multi-dimensional object includes at least one print head configured to eject marking material onto a surface of the multi-dimensional object, a support member positioned parallel to a plane formed by the at least one print head, and an object holder. The object holder includes a moving frame configured to traverse the support member, at least one granule-filled collapsible membrane configured to be retained within the moving frame and at least partially collapsible around the multi-dimensional object when a volume of air is withdrawn therefrom, and at least one inflatable bladder associated with the moving frame and configured to be inflated to retain the at least one collapsible membrane within the moving frame when air is withdrawn from the at least one collapsible membrane.

20 Claims, 11 Drawing Sheets

(56) References Cited

OTHER PUBLICATIONS

U.S. Appl. No. 15/477,502, filed Apr. 3, 2017.
U.S. Appl. No. 15/477,448, filed Apr. 3, 2017.
U.S. Appl. No. 15/477,404, filed Apr. 3, 2017.
U.S. Appl. No. 15/477,375, filed Apr. 3, 2017.
U.S. Appl. No. 15/477,292, filed Apr. 3, 2017.
U.S. Appl. No. 15/477,181, filed Apr. 3, 2017.
U.S. Appl. No. 15/477,198, filed Apr. 3, 2017.
U.S. Appl. No. 15/582,817, filed May 1, 2017.
U.S. Appl. No. 15/621,450, filed Jun. 13, 2017.
U.S. Appl. No. 15/477,631, filed Apr. 3, 2017.

* cited by examiner

OBJECT HOLDER WITH PNEUMATIC CLAMPING FRAME FOR A DIRECT-TO-OBJECT PRINTER

BACKGROUND

Distinguishing consumer products, such as beverages, sports memorabilia, fashion accessories etc., from those of competitors in an attractive and interesting manner increases sales and consumption of the product. The visual appeal of a product may be optimized to appeal to a target market by adding designs on the product or the product container that appeal to the consumers. Furthermore, vendors or service providers often like to personalize their products to advertise the services offered to make the item more fun and entertaining, commemorate a special occasion, or the like. However, while printing on objects during the mass-manufacturing process itself is widely known (e.g., ball skins are printed with patterns or logos prior to the ball being completed and inflated during manufacturing), techniques for individualized printing on objects having curved, non-planar, or non-linear surfaces are generally limited and also very expensive.

For example, current systems for printing on an object having curved, non-planar, or non-linear surfaces require an object holder to hold the object steady while its position and/or orientation is carefully varied with respect to a print head by moving the object holder and/or the print head. Such object holders must be custom designed and made for each object (or for each batch of similar objects) to be printed, requiring additional resources and time which significantly adds to the cost of printing. Moreover, custom designed object holders also take up significant storage space.

This patent document describes devices and methods that are intended to address issues discussed above and/or other issues.

SUMMARY

In accordance with an aspect of the disclosure, an object holder for retaining at least one object in a direct-to-object print system is disclosed. The object holder includes a moving frame configured to traverse a support member positioned substantially parallel to a plane formed by at least one print head of the direct-to-object print system, and at least one collapsible membrane configured to be retained within the moving frame, wherein the at least one collapsible membrane is at least partially filled with a plurality of granules, and further wherein the at least one collapsible membrane is configured to collapse at least partially around the at least one object when a volume of air is withdrawn from the at least one collapsible membrane. The object holder also includes at least one inflatable bladder associated with at least one interior surface of the moving frame, wherein the at least one inflatable bladder is configured to be inflated to retain the at least one collapsible membrane within the moving frame when air is withdrawn from the at least one collapsible membrane.

According to another aspect of the disclosure, a direct-to-object print system for printing on at least one surface of at least one multi-dimensional object is disclosed. The direct-to-object print system includes at least one print head configured to eject marking material onto the at least one surface of the at least one multi-dimensional object, and a support member positioned parallel to a plane formed by the at least one print head. The system also includes an object holder having a moving frame configured to traverse the support member, at least one collapsible membrane configured to be retained within the moving frame, wherein the at least one collapsible membrane is at least partially filled with a plurality of granules, and further wherein the at least one collapsible membrane is configured to collapse at least partially around the at least one multi-dimensional object when a volume of air is withdrawn from the at least one collapsible membrane. The object holder also includes at least one inflatable bladder associated with at least one interior surface of the moving frame, wherein the at least one inflatable bladder is configured to be inflated to retain the at least one collapsible membrane within the moving frame when air is withdrawn from the at least one collapsible membrane, and a removable base platen configured to temporarily interface with the moving frame, wherein the removable base platen provides initial support for the at least one multi-dimensional object prior to withdrawal of the volume of air from the at least one collapsible membrane.

In accordance with another aspect of the disclosure, a method for printing on at least one multi-dimensional object is disclosed. The method includes providing an object holder, the object holder comprising a moving frame and at least one inflatable bladder associated with one or more surfaces of the moving frame, placing the at least one multi-dimensional object within the moving frame of the object holder, and inserting at least one granule-filled collapsible membrane within the moving frame and at least partially around at least one surface of the at least one multi-dimensional object. The method also includes applying a vacuum on the at least one granule-filled collapsible membrane, applying pressurized air to the at least one inflatable bladder to provide a clamping force on the at least one granule-filled collapsible membrane, transporting the object holder past at least one print head, and printing directly on at least one surface of the at least one multi-dimensional object held within the object holder.

DETAILED DESCRIPTION

Figure 1:
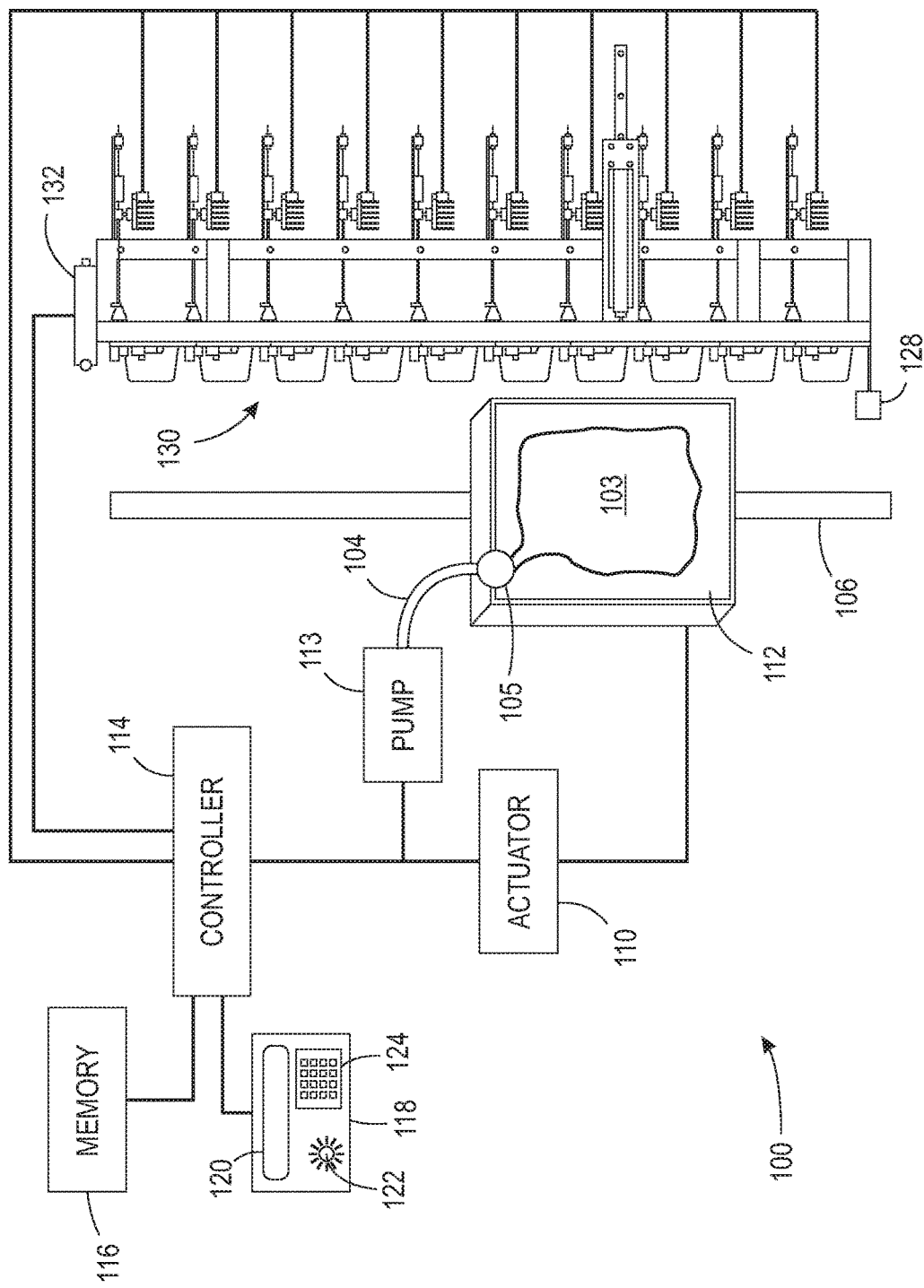
FIG. 1 illustrates an example of a print system for printing on a 3-dimensional object, according to an embodiment.

This disclosure is not limited to the particular systems, methodologies or protocols described, as these may vary. The terminology used in this description is for the purpose of describing the particular versions or embodiments only, and is not intended to limit the scope.

As used in this document, any word in singular form, along with the singular forms "a," "an" and "the," include the plural reference unless the context clearly dictates otherwise. Unless defined otherwise, all technical and scientific terms used herein have the same meanings as commonly understood by one of ordinary skill in the art. All publications mentioned in this document are incorporated by reference. Nothing in this document is to be construed as an admission that the embodiments described in this document are not entitled to antedate such disclosure by virtue of prior invention. As used herein, the term "comprising" means "including, but not limited to."

The term "object" refers to a print media substrate that is made of any multi-dimensional material. An object may include planar, curved, non-planar, or non-linear surfaces. Content may be printed on the print media substrate using toner and/or ink. The object may, for example, include one or more areas comprising characters, and one or more other areas comprising images. Examples of objects which can be printed as described below include, without limitation, round, spherical, rectangular, square, oval, or curved objects such as sporting balls, various types of containers (such as mugs, bottles, etc.), textile materials (such as fabrics used in clothing, hats, footwear, or other apparel), pens, photoframes, ceramics, or the like.

A "print device" or "print engine" is a device that is configured to print content on an object based on digital data, or a multi-functional device in which one of the functions is printing content based on digital data. Example components of a print device include a print head, which may include components such as a print cartridge containing ink, toner or another print material so that the print head can print characters and/or images on the object.

A "print system" is a system of hardware components that include a print device and other components. For example, a printing system may include a marking engine (i.e., the print hardware or print engine) and a digital front end. A digital front end (DFE) is an integrated print workflow management system, including one or more processing devices, capable of receiving and processing print requests and controlling the operation of a print engine to fulfill the print request. The DFE and print engine may be part of a single device (such as a digital printing press), or separate parts of a system of networked devices.

A "processor" or "processing device" is a hardware component of an electronic device that is configured to execute programming instructions. The term "processor" may refer to either a single processor or to multiple processors that together implement various steps of a process. Unless the context specifically states that a single processor is required or that multiple processors are required, the term "processor" includes both the singular and plural embodiments.

This document describes an object holder having a pneumatic clamping frame that may be used to mount one or more objects such that the print system may print on the object(s). In this system, the object holder is capable of receiving one or more objects of various sizes and shapes. In this way, printing on an object may be performed without wasting time and resources for designing and manufacturing object holders for each type of object, regardless of the dimensions, shape, or other characteristics of the object, and without compromising on the registration.

FIG. 1 illustrates an example of a print system 100 for printing on an object. In some embodiments, the print system 100 may include an array or other set of print heads 130, a support member 106, a moving frame 112 movably mounted to the support member 106, an actuator 110 operatively connected to the moving frame 112, at least one collapsible object holding membrane 103 configured to be held on and/or within the moving frame 112, and a controller 114 in communication with the print heads 130 and the actuator 110. As shown in FIG. 1, the array of print heads 130 may be arranged in a two-dimensional array, (e.g., a 10×1 array), although other array configurations can be used. In some embodiments, the controller 114 is also operatively connected to an optical sensor 132.

Each print head 130 may be an element (such as an inkjet) which emits or ejects a droplet of marking material such as ink on to a surface of an object, thereby making a mark on that object. In one embodiment, the direct-to-object print system has a plurality of monochrome print heads and a UV cure lamp. Each print head 130 is fluidly connected to a supply of marking material (not shown). Some or all of the print heads 130 may be connected to the same supply. Alternatively and/or additionally, each print head 130 can be connected to its own supply such that each print head ejects a different marking material.

In various embodiments, the support member 106 may be positioned to be parallel to a plane formed by the array of print heads 130 and, as shown in FIG. 1, is oriented so one end of the support member 106 is at a higher gravitational potential than the other end of the support member 106. Such an orientation enables the printing system 100 to have a smaller footprint than that of an alternative embodiment, which horizontally orients the array of print heads. While FIG. 1 illustrates a single rail acting as a support member 106, it will be understood to those skilled in the art that a support member 106 incorporating a plurality of rails disposed parallel to each other are within the scope of this disclosure.

In some embodiments, a moving frame 112 is movably mounted to the support member 106 to enable the moving frame 112 to slide along the support member 106. In some embodiments, the moving frame 112 may move bi-directionally along the support member 106. In other embodiments, the support member 106 may be configured to provide a return path to the lower end of the support member 106 to form a track for the movably mounted member. In some embodiments, an actuator 110 may be operatively connected to the moving frame 112 and configured to move the moving frame 112 along the support member 106 such that the object holding membrane(s) 103 coupled to the moving frame 112 may pass the array of print heads 130 in one dimension of the two-dimensional array of print heads 130. In the embodiment, the object holding membranes 103 may be capable of holding an object (not shown in FIG. 1) along the length dimension of the array of print heads 130. In some embodiments, the gap present between the object(s) carried by the object holding membrane(s) 103 and the print heads 130 is in a range of, e.g., about five to about six mm.

The controller 114 may be configured with programmed instructions stored in a memory 116 in communication with the controller 114 to allow the controller 114 to execute programmed instructions to operate components in the printing system 100. In some embodiments, the controller 114 may be configured to provide instruction to the actuator 110 to move the moving frame 112 (and object holding membrane(s) 103) past the array of print heads 130. The controller 114 may also be configured to operate the array of print heads 130 to eject marking material onto objects held by the object holding membrane(s) 103 as the object holder 103 passes the array of print heads 130.

Referring still to FIG. 1, the object holding membrane(s) 103 may be configured to physically restrain an object while the moving frame 112 is moved along the support member 106, thereby enabling the restrained object to pass by the array of print heads 130, regardless of its shape and/or size. As will be set forth in further detail hereinbelow, the at least one object holding membrane 103 may be formed of at least one collapsible membrane, wherein each membrane is formed as an airtight sack at least partially filled with granules. An outer surface of the membrane 103 may have a coefficient of static friction of, e.g., at least 0.2 or greater, which allows the collapsed membrane 103 to better grip a surface of the object being retained. In some embodiments, the membrane 103 may be formed of a rubberized material. The membrane 103 may also be made of a puncture-resistant or puncture-proof material having relatively high elasticity. The membrane 103 collapses at least partially around an object when a volume of air is withdrawn from the membrane 103 by a vacuum pump 113 fluidly coupled thereto. Accordingly, vacuum-packed granules (not shown) inside the collapsed membrane 103 tightly conform to the shape and contours of at least one side of the object, thereby securing the object to the coupled moving frame 112.

A "granule" is a relatively small grain or particle. Granules stored within membrane 103 may be, for example, coffee grounds, sand, rice, pellets, beads, knucklebones (also called "jacks"), an ester-based polyurethane foam packing material, etc. The individual granules may be between 2-5 mm in circumference, but may be larger or smaller depending on the implementation. Furthermore, not all of the granules are necessarily the same size and shape. Additionally, the granules may be multi-faceted, which may assist in retaining an object to the moving frame 112 when they are vacuum-packed tightly together.

Vacuum pump 113 may be connected to the object holding membrane 103 through a vacuum hose 104. The vacuum hose 104 may be any appropriate conduit, such as a rigid hose, a soft, flexible hose, etc. When a volume of air is withdrawn from the membrane 103, the membrane 103 is configured to at least partially collapse around the object, thereby causing the vacuum-packed granules to conform to a shape of the object to be printed. In one embodiment, a relief valve 105 may be utilized to equalize the air pressure inside the membrane 103 so that the object can be released from the moving frame 112. The vacuum pump 113 and valve 105 may be operated by controller 114.

Controller 114 may include a processor or application-specific integrated circuit (ASIC) which controls various components of the present direct-to-object print system 100. For example, the controller 114 may be configured to retrieve machine readable program instructions from memory 116 which, when executed, configure the controller 114 to signal or otherwise operate the actuator 110 to move the moving frame 112 past the print heads 130. When other retrieved instructions are executed, the controller 114 may be configured to signal, or otherwise operate, the print heads 130 to start/stop ejecting marking material at a precise time and at a desired location on a surface of the object retained by the membrane(s) 103. In another example, the controller 114 may be further configured to operate the various print heads 130 such that individual print heads 130 eject different size droplets of marking material.

The controller 114 may also be configured to communicate with a user interface 118. User interface 118 may include a display 120 (such as a touchscreen, monitor, or LCD device) for presenting visual information to a user, an annunciator 122 which emits an audible sound, and an input device 124 (such as a keypad) for receiving a user input or selection. The controller 114 can be configured to operate the user interface 118 to notify an operator of a failure. The controller 114 may monitor the system to detect the configuration of the print heads 130 in the system and the inks being supplied to the print heads 130. If, for example, any of the print heads are unable to print upon the objects accurately and appropriately, a message may be presented to the user on the display 120 that, e.g., inks may need to be changed or that the print heads 130 may need to be reconfigured. The controller 114 can be configured to use the annunciator 122 to inform the operator of a system status and to attract attention to fault conditions and displayed messages.

Print system 100 may further include a sensor 128. Sensor 128 may be a device such as a digital camera or other imaging device positioned to generate image data by imaging, for example, a sheet of printed media with a test pattern. The controller 114 may be configured to receive the image data from the sensor 128 and analyze the image data to identify print head alignment, image quality, and other maintenance issues such as inoperative ejectors, low ink supply, or poor ink quality.

Figure 2:
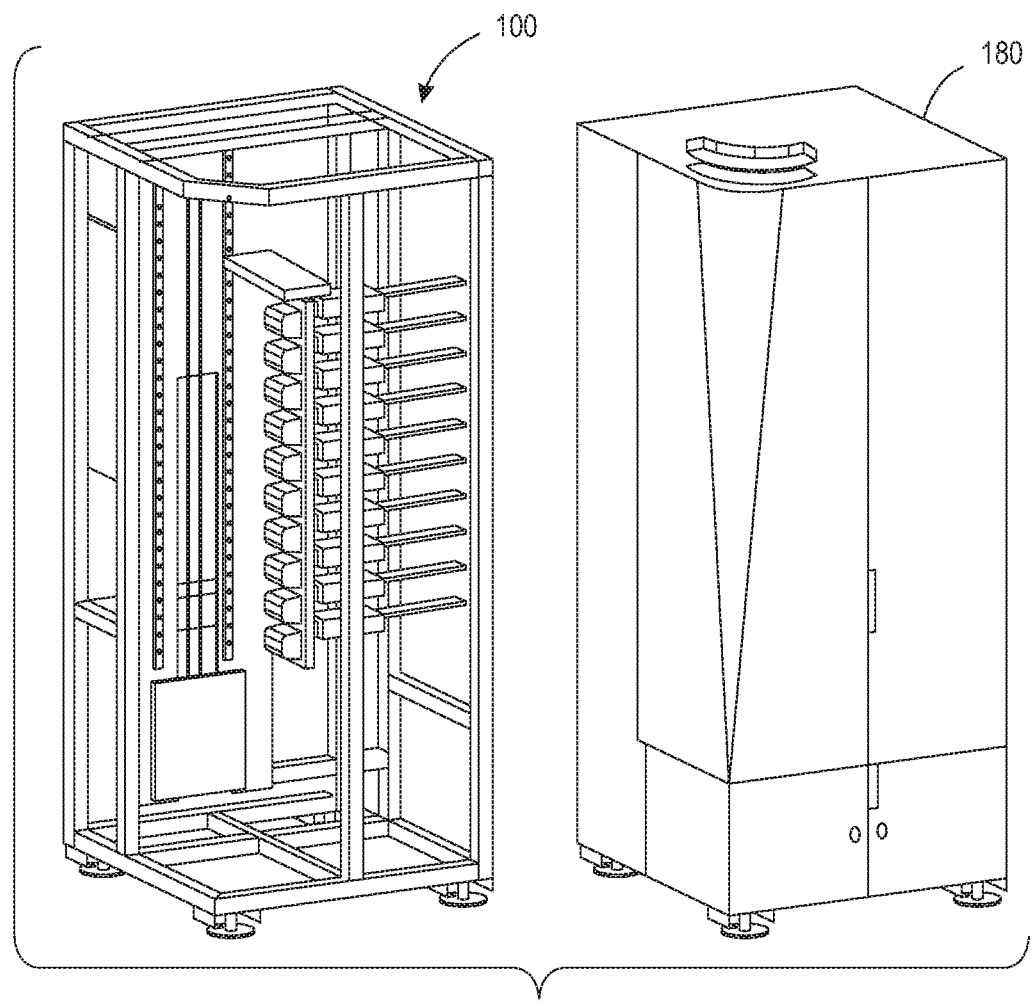
FIG. 2 illustrates an example cabinet within which the print system of FIG. 1 may be installed, according to an embodiment.

In various embodiments, the system configuration such as that shown in FIG. 1 may be housed in a single cabinet 180, as depicted in FIG. 2, and installed in non-production outlets. Once installed within cabinet 180, moving frame 112 and object holding membrane(s) 103, as described further hereinbelow, may be used with the system 100 to print a variety of goods.

Figure 3:
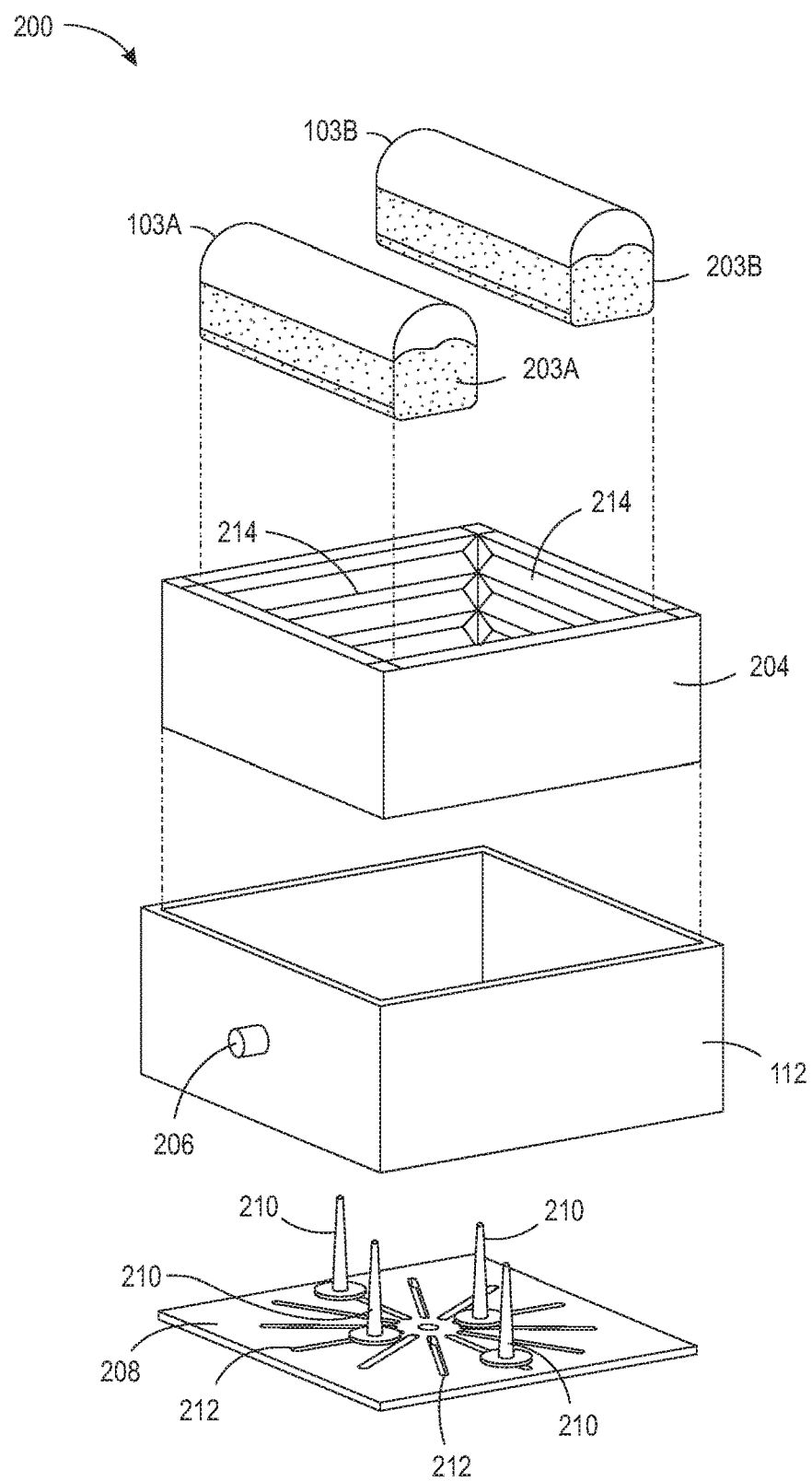
FIG. 3 illustrates an exploded view of an object holder having a pneumatic frame assembly for mounting an object in the print system of FIG. 1, according to an embodiment.

Referring now to FIGS. 3-8F, an object holding system 200 in accordance with an embodiment of the present disclosure is illustrated. As shown in FIG. 3, system 200 includes moving frame 112 having a pivot extension 206, a pair of collapsible membranes 103A, 103B having a plurality of granules 203A, 203B stored therein, a base platen 208 having a plurality of adjustable datum pins 210 coupled thereto, and an inflatable bladder 204 sized and configured to fit within the inner walls of moving frame 112. While two membranes 103A, 103B are shown in relation to FIGS. 3-8F, it is to be understood that more or fewer collapsible membranes may be utilized. Additionally, for the sake of clarity in the drawings, membranes 103A, 103B are shown without connection to (and interfaces for) one or more vacuum pumps for providing a vacuum to compress the granules 203A, 203B. However, it is to be understood that each membrane 103A, 103B is coupled to one or more vacuum pumps, similar to the configuration between vacuum pump 113 and collapsible membrane 103 shown and described above with respect to FIG. 1. Furthermore, while not shown in FIGS. 3-8F for the sake of clarity, it is to be understood that inflatable bladder 204 is coupled to a controllable air or other fluid supply, which allows inflatable bladder 204 to be manually or automatically inflated and/or deflated. Additionally and/or alternatively, inflatable bladder 204 may be formed as a single, continuous bladder, or may be formed of a plurality of distinct bladders.

As shown in FIGS. 3-6, moving frame 112 is formed as a four-sided structure having a substantially square peripheral shape, although other shapes such as rectangular or circular shapes may be used. Inflatable bladder 204 is sized and configured to fit closely to the interior walls of frame 112. Inflatable bladder 204 may be permanently affixed to the interior walls of frame 112 via, for example, an adhesive, a plurality of connectors, etc. Alternatively, inflatable bladder 204 may be removably coupled to the interior walls of frame 112 via, for example, hook-and-look connectors, a plurality of snap connectors, etc., or inflatable bladder 204 may not be affixed or coupled directly to the interior walls of frame 112 in any way. Inflatable bladder 204 may include one or more sealed air chambers 216 formed therein, which allow for the inward expansion of inflatable bladder 204 when inflated via the coupled pressurized gas or fluid. Furthermore, the inward-facing sides of inflatable bladder 204 may include a corrugated surface 214. As will be described further hereinbelow, corrugated surface 214 may aid in providing a grip on the collapsible membranes 103A, 103B when bladder 204 is inflated. Inflatable bladder 204 may also be formed of a material that enhances the grip on collapsible membranes 103A, 103B, or be provided with a surface treatment to similarly enhance such grip.

Figure 4:
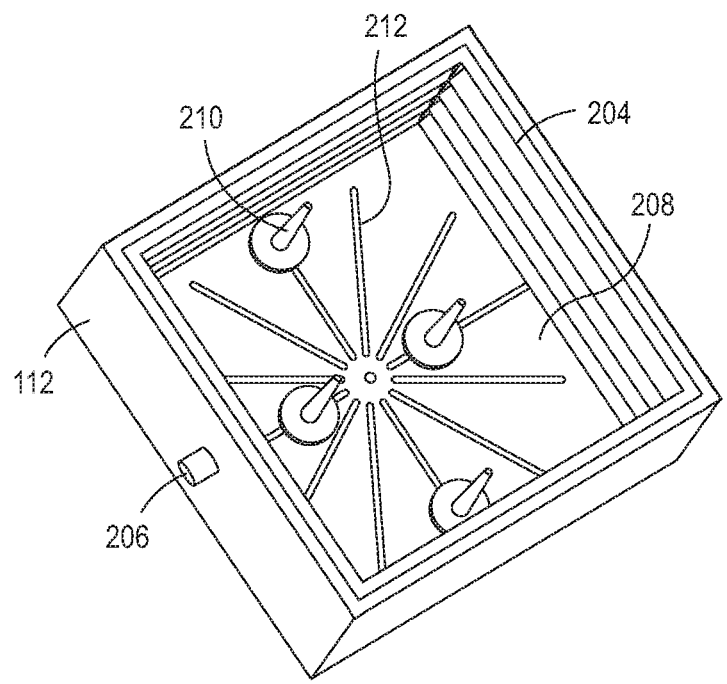
FIG. 4 illustrates a perspective view of the pneumatic frame assembly of FIG. 3, according to an embodiment.
Figure 5:
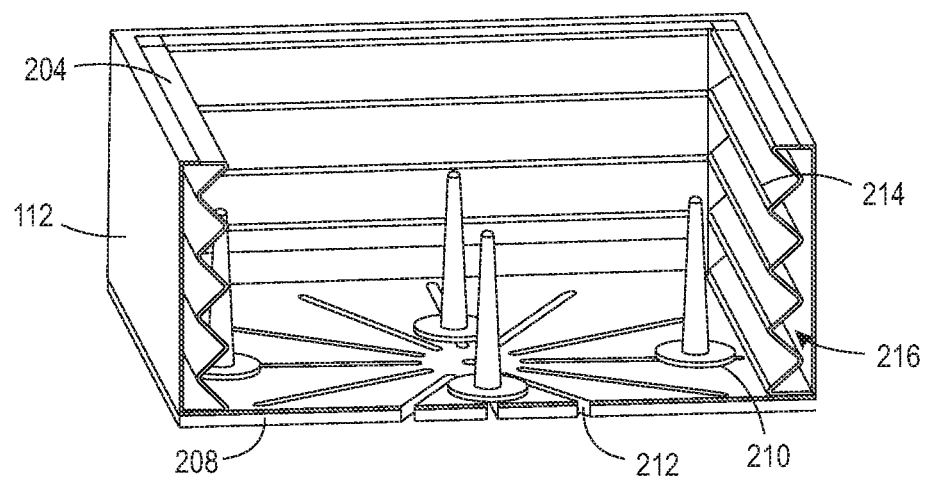
FIG. 5 illustrates a cross-sectional view of the pneumatic frame assembly of FIG. 4, according to an embodiment.

Base platen 208 is formed in a shape substantially complementary to that of frame 112, such that base platen 208, when abutted against frame 112, may substantially close one side of frame 112, as shown in FIGS. 4-5. Base platen 208 includes a plurality of elongated slots 212 formed therethough. Slots 212 are shown in FIGS. 3-6 as extending radially outward from the center of base platen 208. However, it is to be understood that slots 212 may formed in different configurations than those shown in FIGS. 3-6, and more or fewer slots 212 may be utilized.

Figure 6:
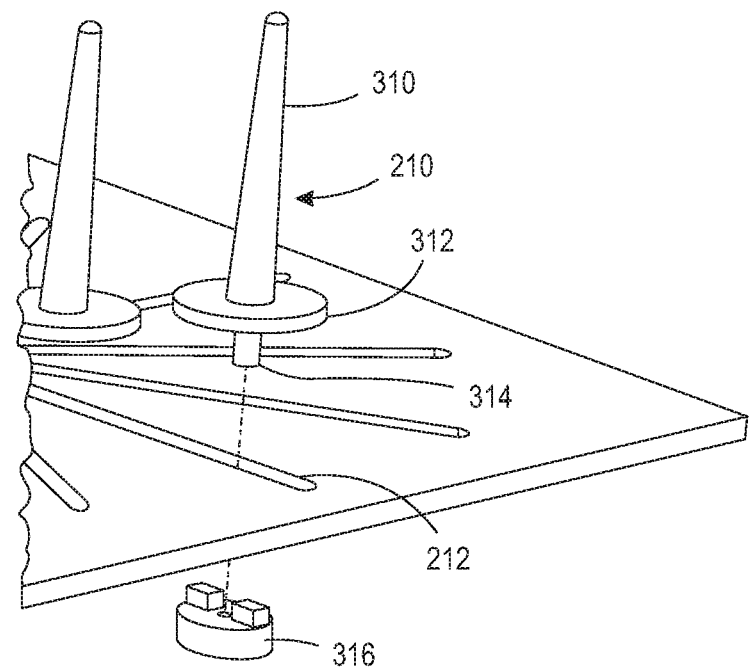
FIG. 6 depicts an exploded view of a datum pin configuration for the pneumatic frame assembly of FIG. 4, according to an embodiment.

One or more datum pins 210 may be mounted in any one of the slots 212 of base platen 208. Datum pins 210 are configured to be adjustable and movable along slots 212 to form temporary supports for an object to be printed upon. As shown in FIG. 6, each datum pin 210 may include an upper portion 310, a rim portion 312, and a lower portion 314. In some embodiments, upper portion 310 may be tapered toward an end opposite rim portion 312, which may aid in the installation and removal of an object between datum pins 210, as well as the installation and removal of the base platen 208 after completion of a printing operation. Rim portion 312 may be sized to maintain datum pin 210 at a certain depth within slots 212. Furthermore, lower portion 314, which is configured to pass at least partially through slots 212, may be couplable to a connector, such as a guide nut 316, which allows each datum pin 210 to be adjustable along a given slot 212 when guide nut 316 is loosened, yet selectively fixed at a location along the slot 212 when guide nut 316 is tightened, dependent upon the size and shape of the object to be printed upon.

Figure 7:
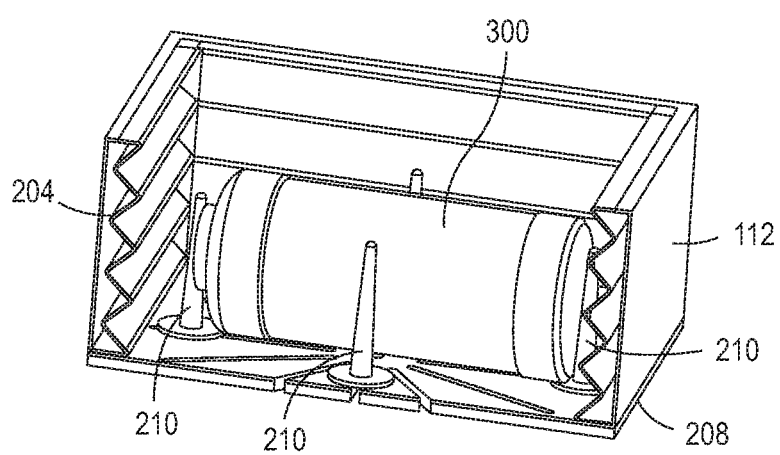
FIG. 7 illustrates a cross-sectional view of the pneumatic frame assembly of FIG. 4 having an object held therein, according to an embodiment.

For example, FIG. 7 illustrates an object 300 (e.g., a water bottle) held between a plurality of datum pins 210 upon base platen 208 and within moving frame 112. The number and positioning of datum pins 210 may be chosen based on the size and shape of the object 300. Prior to an initial printing procedure on an object 300, the datum pins 210 may be adjusted for optimal positioning of the object 300 within the moving frame 112. Once optimal positioning is obtained, the datum pins 210 may be fixed in the selected location, and thus subsequent printing operations for objects identical to object 300 do not require further adjustment of datum pins 210.

Figure 8A:
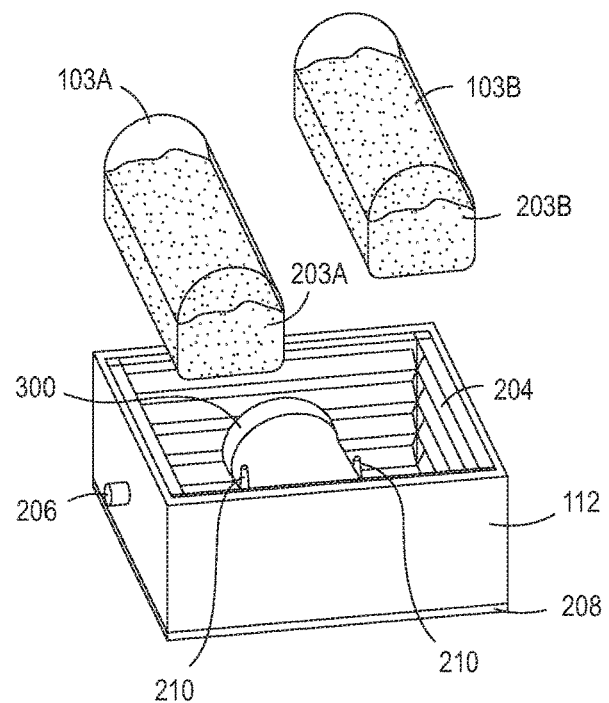
FIG. 8A illustrates a partially exploded view of the object holder having a pneumatic frame assembly and collapsible membranes, according to an embodiment.

Referring now to FIGS. 8A-8F, an example of operation steps to perform an object printing procedure utilizing an object holding system 200 is shown and described in accordance with one embodiment. In FIG. 8A, object 300 may be placed within moving frame 112, between a plurality of datum pins 210, as described above with respect to FIGS. 6-7, with base platen 208 being held substantially adjacent to one open side of moving frame 112. Inflatable bladder 204 may be maintained in a deflated state, as collapsible membranes 103A, 103B remain outside of the moving frame 112 in an uncollapsed state, with little to no vacuum application to compress the granules 203A, 203B therein.

Figure 8B:
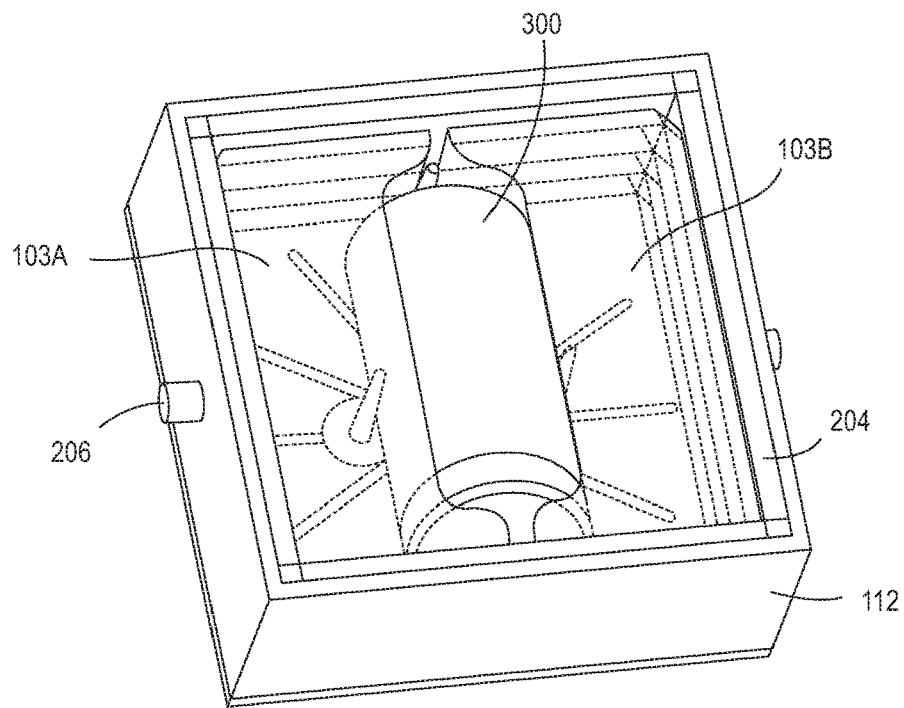
FIG. 8B illustrates a perspective view of the object holder having a pneumatic frame assembly and collapsible membranes, according to an embodiment.
Figure 8C:
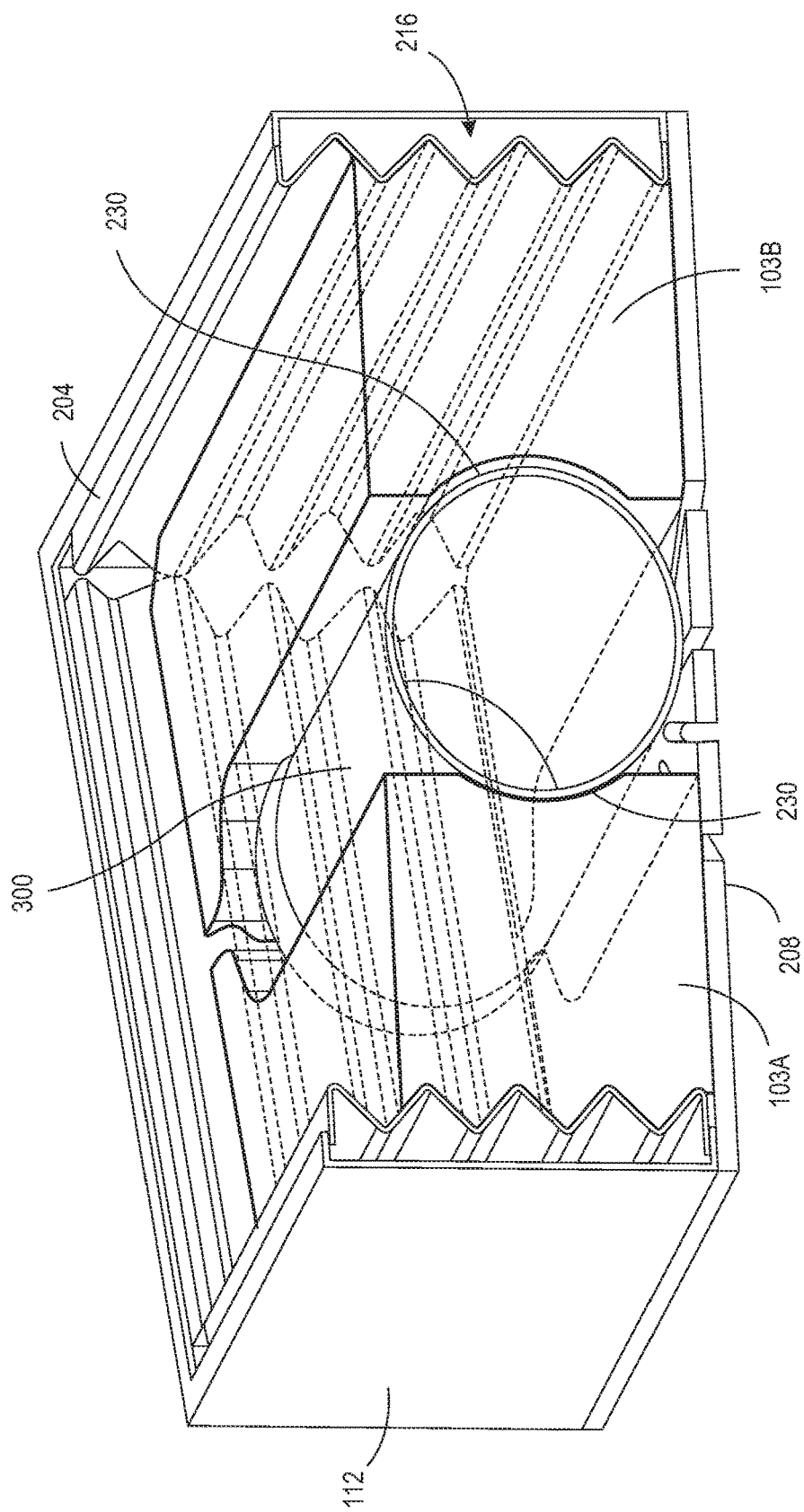
FIG. 8C illustrates a cross-sectional view of the pneumatic frame assembly and collapsible membranes of FIG. 8B, according to an embodiment.

Next, referring to FIGS. 8B-8C, both membranes 103A, 103B may be placed within moving frame 112 so as to substantially surround at least one side portion of the object 300 being held within moving frame 112 between datum pins 210. Once placed within moving frame 112 in a desired position, a vacuum may be applied to both membranes 103A, 103B via, for example, a pump 113 (as shown in FIG. 1). With the vacuum applied, the granules within membranes 103A, 103B cause the membranes to tightly compress around the surfaces 230 of object 300, thereby clenching the object 300.

While the inward-facing surfaces of membranes 103A, 103B compress around object 300, the outward-facing surfaces also compress due to the applied vacuum, leading to a slight movement of membranes 103A, 103B away from the inner walls of moving frame 112. Thus, in order to retain membranes 103A, 103B (and object 300) within the moving frame 112, pressurized air (or another fluid) is applied to bladder 204 in order to inflate the bladder 204. This inflation of bladder 204 causes a clamping force on at least some outer surfaces of membranes 103A, 103B, thereby compressing and holding membranes 103A, 103B within moving housing 112. Without bladder 204, membranes 103A, 103B would not be held tightly within moving housing 112 when compressed via applied vacuum, which would potentially cause movement of the object 300 and subsequent ineffective or incomplete printing operations. Valves (not shown) may be present on both the membranes 103A, 103B and bladder 204 so as to maintain pressures within each, thereby enabling transport of the system to and from the printing cabinet without the need for active connection to a vacuum pump and/or air/fluid supply.

Figure 8D:
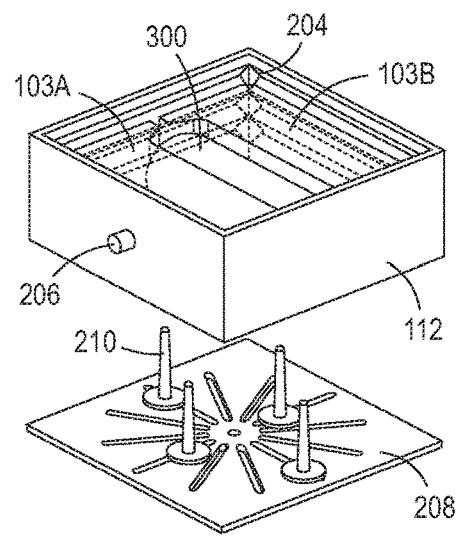
FIG. 8D illustrates a perspective view of the object holder having a pneumatic frame assembly, collapsible membranes, and releasable datum pin configuration of FIG. 8B, according to an embodiment.
Figure 8E:
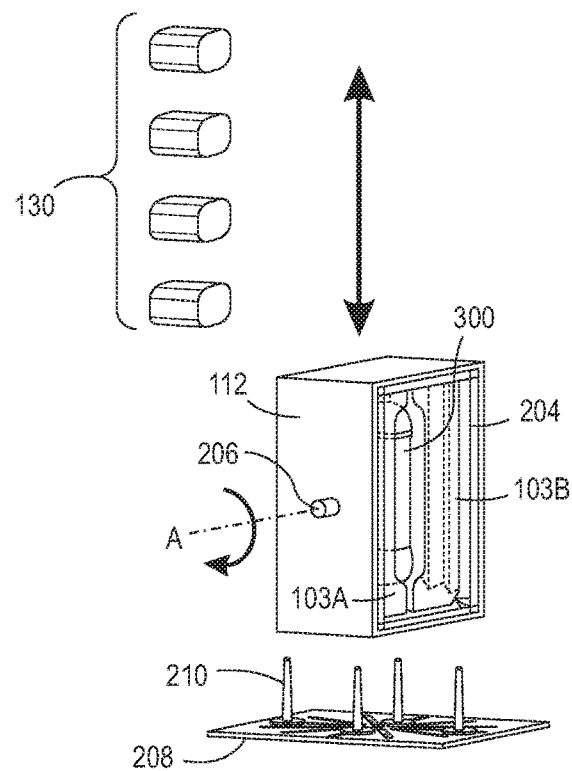
FIG. 8E illustrates a schematic view of the object holder and print system, according to an embodiment.

Referring now to FIGS. 8D-8E, once the membranes 103A, 103B are compressed and bladder 204 is inflated, object 300 is securely held within frame 112, even without datum pins 210. Accordingly, moving frame 112 may be lifted away from base platen 208, thereby freeing object 300 from tapered datum pins 210 and exposing two sides portions of object 300 suitable for printing. As shown in FIG. 8E, moving frame 112 may be rotated at pivot extension 206 along axis A so as to be substantially perpendicular to base platen 208. Once in this substantially perpendicular position, moving frame 112 may be moved vertically along, for example, a support member 106 shown in FIG. 1. Accordingly, moving frame 112 (and object 300) are configured to travel past a plurality of print heads 130 in order to allow direct-to-object printing upon object 300, as is again described above with respect to FIG. 1.

Figure 8F:
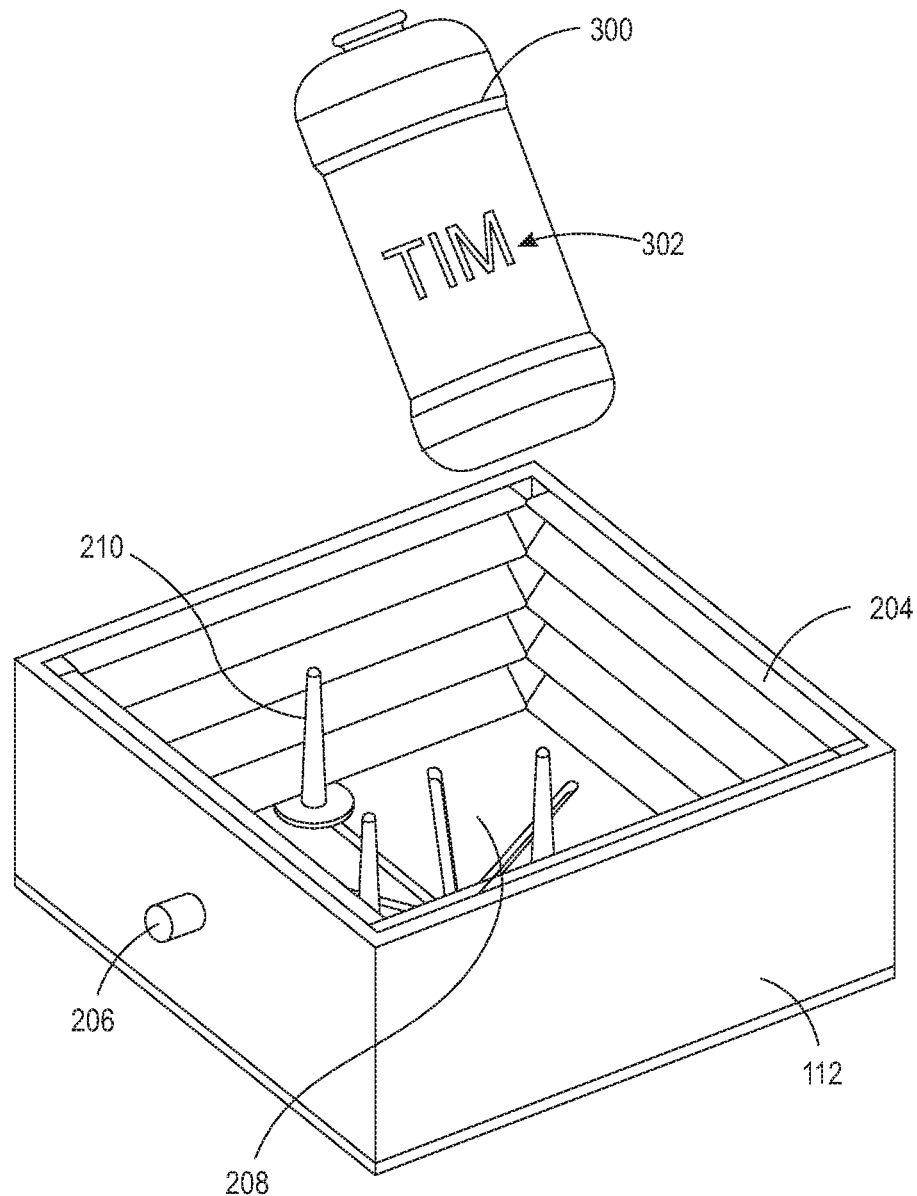
FIG. 8F illustrates the object holder and printed object, according to an embodiment.

Upon completion of a direct-to-object printing operation, the object 300 may be removed from moving frame 112. As shown in FIG. 8F, moving frame 112 may be returned to its position adjacent base platen 208, bladder 204 may be deflated, decompressed membranes 103A, 103B may be removed from moving frame 112, and the object 300 may also be removed from between datum pins 210. Removal of object 300 may take place automatically (via a robotic arm, etc.) or manually. Additional, removal of object 300 may be done within the cabinet 180, or it may be done offline, outside of cabinet 180. The object 300, with a printed indicia 302 or other printed marking, may then be packaged, either alone or along with other objects. However, due to the datum pins 210 remaining in a specified location, another, separate object substantially the same as object 300 may be placed between datum pins 210, and the direct-to-object printing process described above with respect to FIGS. 8A-8F may be repeated. In this way, objects of varying shapes and sizes may be quickly and efficiently printed upon, without the need for costly and space-consuming specialized object holders for each type of object.

While moving frame 112 is shown and described with respect to FIGS. 3-8F as being a substantially square frame, it is to be understood that moving frame 112 may be any appropriate shape and size, such as rectangular, hexagonal, cylindrical, etc. Also, while only one object 300 is shown as being disposed within moving frame 112, it is to be understood that the system 200 may be configured to hold more than one object at a time within moving frame 112, subsequently allowing for direct-to-object printing on more than one object at a time.

Furthermore, while bladder 204 is an inflatable bladder used to provide pneumatic clamping force to hold one or more compressible membranes within moving frame 112, it is to be understood that other means of providing clamping force, such as mechanical and/or electro-mechanical clamps, may be utilized in lieu of gas or fluid-filled bladders. Also, while bladder 204 is shown as being disposed on all four inner side walls of moving frame 112, it is also possible for only two opposing bladders (or other clamping mechanisms) to be used to provide a clamping force on two opposing surfaces of the collapsible membrane(s).

Figure 9:
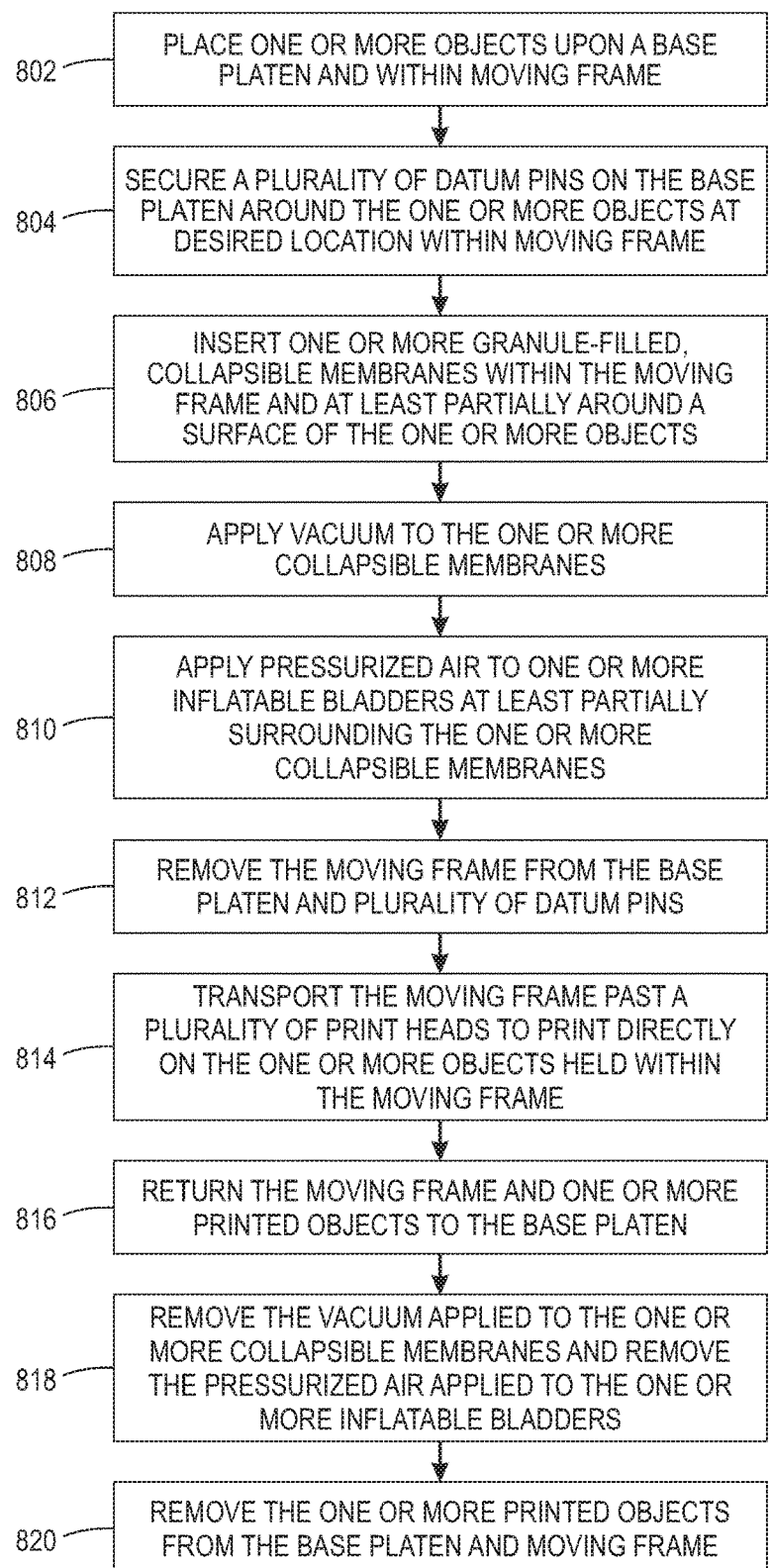
FIG. 9 depicts a flowchart illustrating an example method of a using an object holder for printing on an object, according to an embodiment.

Referring to FIG. 9, an example flowchart describing a method for using an object holder for printing on one or more objects in accordance with an embodiment is illustrated.

In step 802, one or more objects subject to printing are placed upon a base platen that is held adjacent to a moving frame. In step 804, a plurality of datum pins disposed on the base platen are secured around the one or more objects in order to pre-stage and provide a repeatable positioning for the one or more objects within the moving frame. In some instances, step 804 may only be applicable to the first time one or more objects of the same type are to be printed upon. Accordingly, in subsequent printing operations involving substantially the same or similar object types, step 804 may be unnecessary, as the location of the datum pins preferably does not change for the same or similar object types.

Next, in step 806, one or more granule-filled, collapsible membranes are inserted within the moving frame such that at least one surface of the collapsible membrane(s) at least partially surrounds at least one surface of the one or more objects to be printed. Then, in step 808, vacuum pressure is applied to the one or more collapsible membranes. As described above, this vacuum pressure causes granules within the collapsible membrane(s) to compress around the at least one surface of the one or more objects to be printed, thereby providing a clamping force to hold the one or more objects.

In step 810, pressurized air is applied to one or more inflatable bladders which at least partially surround the one or more collapsible membranes within the moving frame. This application of pressurized air inflates the bladders to a point where they provide a clamping force on the collapsible membrane(s), thereby retaining the collapsible membrane(s) (and object(s) to be printed) securely within the moving frame.

In step 812, the moving frame is removed from the base platen and datum pins, as the combination of the one or more collapsible membrane and one or more inflatable bladder is capable securely holding the object(s) within the moving frame. Then, in step 814, the moving frame is transported past a plurality of print heads to allow the system to print directly upon the one or more objects held within the moving frame. The moving frame may move vertically along a support member, as described above with respect to FIG. 1.

Next, in step 816, once the print heads have completed the printing operation on the object(s), the moving frame and one or more objects are returned to the base platen. Then, in step 818, the vacuum is removed from the one or more collapsible membranes, and the pressurized air is similarly removed from the one or more inflatable bladders. In step 820, the one or more finished, printed objects may then be removed from the base platen and moving frame (either automatically or manually).

Figure 10:
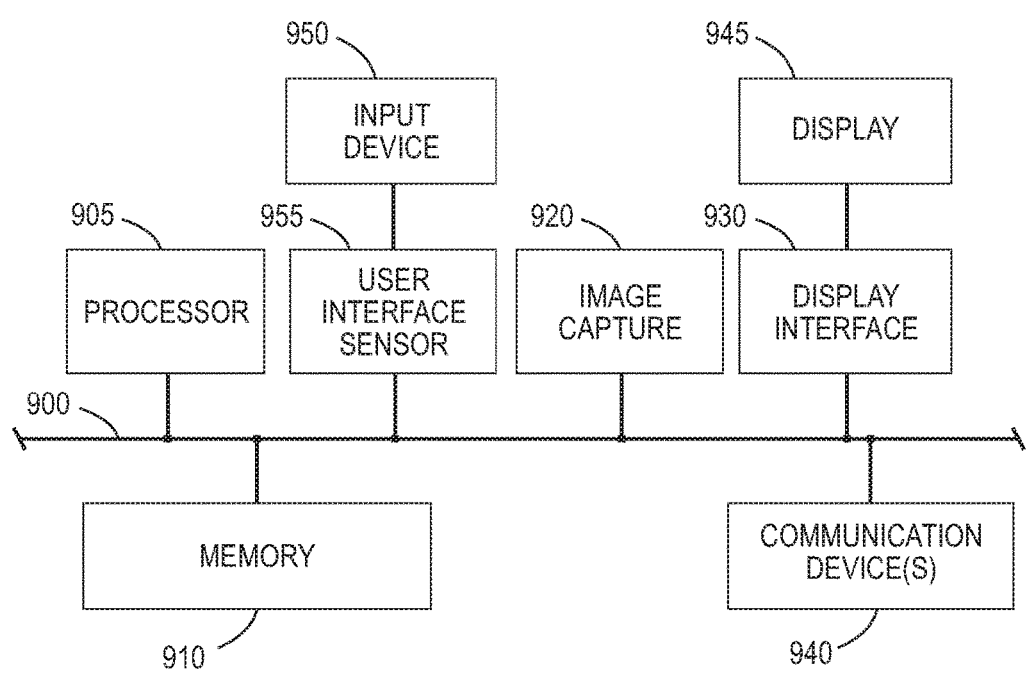
FIG. 10 depicts various embodiments of one or more electronic devices for implementing the various methods and processes described herein.

FIG. 10 depicts an example of internal hardware that may be included in any of the electronic components of the print system, such as the controller, or the print device. An electrical bus 900 serves as an information highway interconnecting the other illustrated components of the hardware. Processor 905 is a central processing device of the system, configured to perform calculations and logic operations required to execute programming instructions. As used in this document and in the claims, the terms "processor" and "processing device" may refer to a single processor or any number of processors in a set of processors. Read only memory (ROM), random access memory (RAM), flash memory, hard drives and other devices capable of storing electronic data constitute examples of memory devices 910. A memory device may include a single device or a collection of devices across which data and/or instructions are stored.

An optional display interface 930 may permit information from the bus 900 to be displayed on a display device 945 in visual, graphic or alphanumeric format. An audio interface and audio output (such as a speaker) also may be provided. Communication with external devices may occur using various communication devices 940 such as a transmitter, transceiver, antenna, communications port or a similar device. A communication device 940 may be attached to a communications network, such as the Internet, a local area network or a cellular telephone data network.

The hardware may also include a user interface sensor 955 that allows for receipt of data from input devices 950 such as a keyboard, a mouse, a joystick, a touchscreen, a remote control, a pointing device, a video input device and/or an audio input device. Data also may be received from an image capturing device 920, such of that a scanner or camera.

The above-disclosed features and functions, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. An object holder for retaining at least one object in a direct-to-object print system, the object holder comprising:
   a moving frame configured to traverse a support member positioned substantially parallel to a plane formed by at least one print head of the direct-to-object print system;
   at least one collapsible membrane configured to be retained within the moving frame, wherein the at least one collapsible membrane is at least partially filled with a plurality of granules, and further wherein the at least one collapsible membrane is configured to collapse at least partially around the at least one object when a volume of air is withdrawn from the at least one collapsible membrane; and
   at least one inflatable bladder associated with at least one interior surface of the moving frame, wherein the at least one inflatable bladder is configured to be inflated to retain the at least one collapsible membrane within the moving frame when air is withdrawn from the at least one collapsible membrane.

2. The object holder of claim 1, wherein the at least one inflatable bladder is attached to one or more interior surfaces of the moving frame.

3. The object holder of claim 2, wherein the at least one inflatable bladder is fixedly attached to the moving frame.

4. The object holder of claim 2, wherein the at least one inflatable bladder is removably attached to the moving frame.

5. The object holder of claim 1, wherein the at least one inflatable bladder comprises at least one corrugated surface.

6. The object holder of claim 1, wherein the at least one collapsible membrane comprises two collapsible membranes.

7. The object holder of claim 1, wherein the moving frame is configured to be pivotable between a position substantially perpendicular to the plane formed by the at least one print head of the direct-to-object print system and a position substantially parallel to the plane formed by the at least one print head of the direct-to-object print system.

8. A direct-to-object print system for printing on at least one surface of at least one multi-dimensional object, the direct-to-object print system comprising:
   at least one print head configured to eject marking material onto the at least one surface of the at least one multi-dimensional object;
   a support member positioned parallel to a plane formed by the at least one print head;
   an object holder comprising:
      a moving frame configured to traverse the support member;
      at least one collapsible membrane configured to be retained within the moving frame, wherein the at least one collapsible membrane is at least partially filled with a plurality of granules, and further wherein the at least one collapsible membrane is configured to collapse at least partially around the at least one multi-dimensional object when a volume of air is withdrawn from the at least one collapsible membrane; and
      at least one inflatable bladder associated with at least one interior surface of the moving frame, wherein the at least one inflatable bladder is configured to be inflated to retain the at least one collapsible membrane within the moving frame when air is withdrawn from the at least one collapsible membrane; and
   a removable base platen configured to temporarily interface with the moving frame,
   wherein the removable base platen provides initial support for the at least one multi-dimensional object prior to withdrawal of the volume of air from the at least one collapsible membrane.

9. The direct-to-object print system of claim 8, further comprising a controller configured to cause the at least one print head to eject marking material onto the at least one multi-dimensional object held by the object holder as the at least one multi-dimensional object passes the at least one print head.

10. The direct-to-object print system of claim 8, further comprising a pump fluidly coupled to the at least one collapsible membrane, wherein the pump is configured to withdraw a volume of air from the at least one collapsible membrane to cause the at least one collapsible membrane to collapse and for the plurality of granules within the at least one collapsible membrane to at least partially conform to a shape of the at least one multi-dimensional object.

11. The direct-to-object print system of claim 8, further comprising a plurality of datum pins associated with the removable base platen, the plurality of datum pins configured to support the at least one multi-dimensional object.

12. The direct-to-object print system of claim 11, wherein the removable base platen further comprises a plurality of slots formed therethrough, and further wherein the plurality of datum pins are configured to be selectively movable within the plurality of slots.

13. The direct-to-object print system of claim 11, wherein each of the plurality of datum pins are tapered.

14. The direct-to-object print system of claim 8, wherein the moving frame of the object holder comprises at least one open side, and further wherein the removable base platen is configured to temporarily interface with the moving frame about the at least one open side.

15. The direct-to-object print system of claim 8, wherein the at least one inflatable bladder comprises at least one inflatable bladder associated with four interior surfaces of the moving frame.

16. A method for printing on at least one multi-dimensional object, the method comprising:
   providing an object holder, the object holder comprising a moving frame and at least one inflatable bladder associated with one or more surfaces of the moving frame;
   placing the at least one multi-dimensional object within the moving frame of the object holder;
   inserting at least one granule-filled collapsible membrane within the moving frame and at least partially around at least one surface of the at least one multi-dimensional object;
   applying a vacuum on the at least one granule-filled collapsible membrane;
   applying pressurized air to the at least one inflatable bladder to provide a clamping force on the at least one granule-filled collapsible membrane;
   transporting the object holder past at least one print head; and printing directly on at least one surface of the at least one multi-dimensional object held within the object holder.

17. The method of claim 16, further comprising providing a base platen having a plurality of movable datum pins thereon and temporarily associating the base platen with the moving frame in order to support the at least one multi-dimensional object within the moving frame.

18. The method of claim 17, further comprising securing the plurality of movable datum pins on the base platen around at least one surface of at least one multi-dimensional object.

19. The method of claim 17, further comprising removing the moving frame from the base platen before transporting the object holder past the at least one print head.

20. The method of claim 17, further comprising returning the moving frame to the base platen after printing directly on at least one surface of the at least one multi-dimensional object.

* * * * *